Oct. 14, 1969     C. W. POOLE     3,472,197
LOW TIRE PRESSURE WARNING DEVICE
Filed Jan. 25, 1968
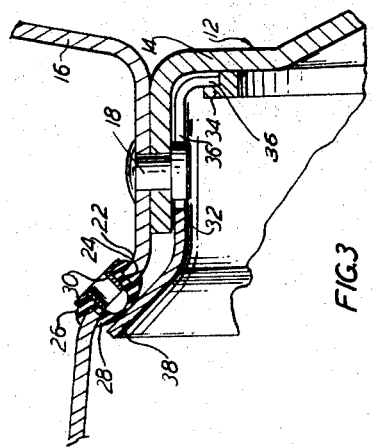
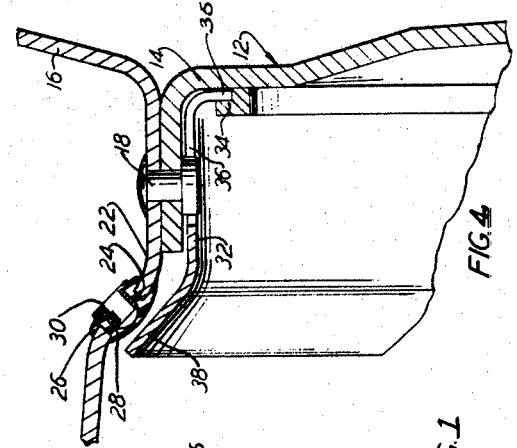
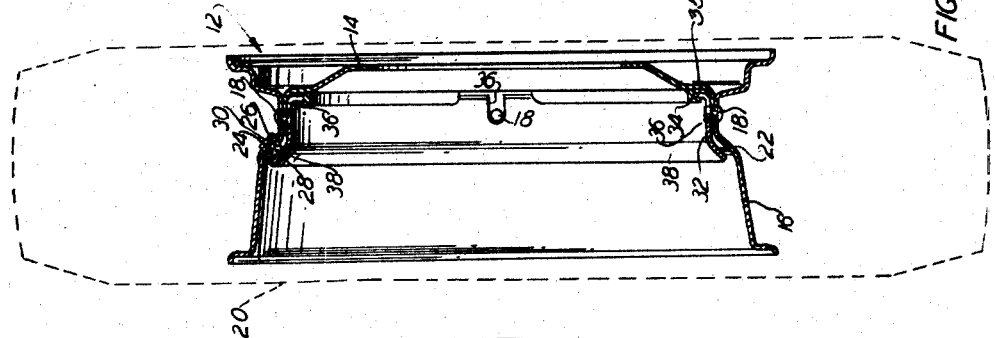
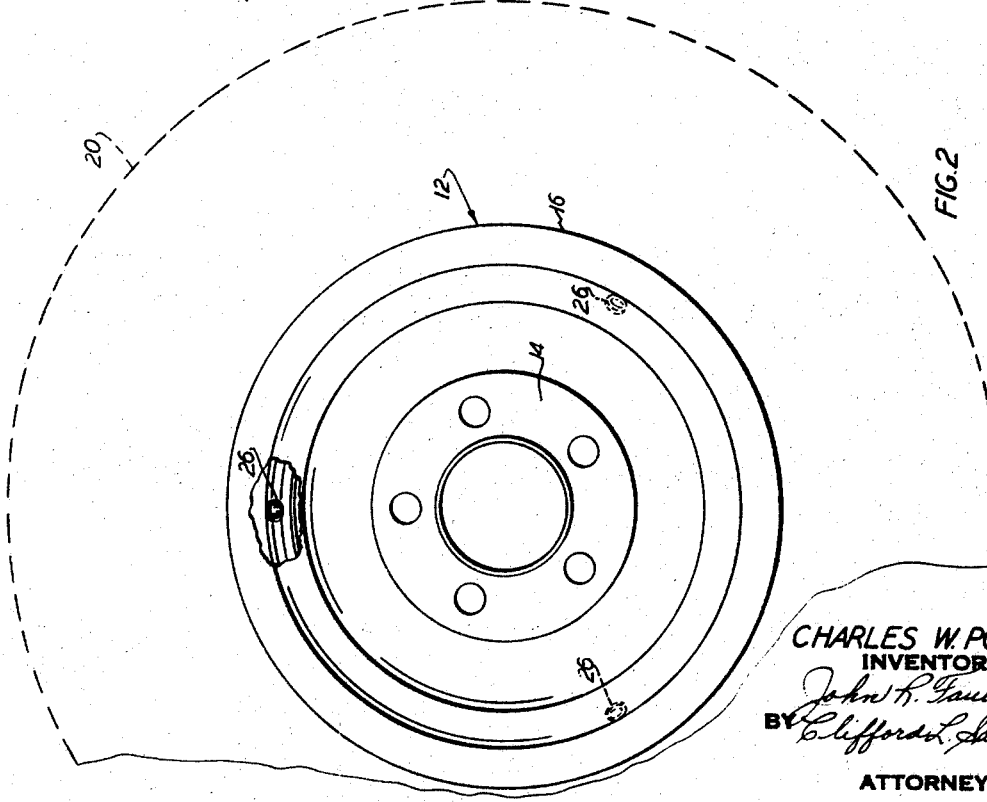
CHARLES W. POOLE
INVENTOR
BY *John R. Faulkner*
*Clifford L. Sadler*
ATTORNEYS

United States Patent Office 3,472,197
Patented Oct. 14, 1969

3,472,197
LOW TIRE PRESSURE WARNING DEVICE
Charles W. Poole, Livonia, Mich., assignor to Ford
Motor Company, Dearborn, Mich., a corporation
of Delaware
Filed Jan. 25, 1968, Ser. No. 700,503
Int. Cl. B60c 23/02, 23/06; G08b 3/00
U.S. Cl. 116—34                                    9 Claims

ABSTRACT OF THE DISCLOSURE

A low tire pressure warning device having a sounding ring mounted within the tire rim. The ring is held firmly in place by inflated rubber pressure sensors when the tire contains normal air pressure. When the tire pressure drops below an acceptable level, the pressure sensors deflate sufficiently to permit the sounding ring to fit loosely within the wheel assembly and to vibrate against the tire rim or wheel assembly providing audible and tactile signals to the vehicle operator.

Background of the invention

Automotive vehicle power assistance devices such as power steering often make a condition of underinflation in one of the vehicle tires difficult to determine. For example, the power steering aids the vehicle driver in overcoming the tendency of the vehicle to turn which normally occurs when a tire is underinflated. Rapid detection of conditions of underinflation of the tires is imperative for the safety of the vehicle occupants as well as for maximum tire life.

This invention provides a low-cost, reliable warning device which gives an audible and tactile signal to a vehicle operator if the air pressure in one of the vehicle tires drops below a predetermined level.

Brief summary of the invention

A low tire pressure warning device constructed in accordance with this invention includes a conventional wheel assembly having a sounding member loosely secured within the radially inner surface of the wheel assembly rim portion. A plurality of pressure sensors are located in holes in the rim portion and are expandable in response to tire pressure. When the tire pressure is normal, the pressure sensors are expanded to hold the sounding ring in a rigid position relative to the wheel assembly. If the pressure within the tire falls below a predetermined level, the pressure sensors deflate and permit the sounding ring to rattle and vibrate, thereby sending audible and vibratory signals to the vehicle driver.

Brief description of the drawings

FIGURE 1 is a diametrical cross section of a tire and wheel assembly embodying the invention. FIGURE 2 is a view of the outboard side of a tire and wheel assembly with parts broken away showing the positioning of the pressure sensors. FIGURE 3 is an enlarged portion of FIGURE 1 showing the pressure sensors in an inflated condition holding the sounding ring rigid relative to the wheel rim assembly. FIGURE 4 is an enlargement of a portion of FIGURE 1, but illustrating the pressure sensors in a deflated condition in which the sounding ring is free to vibrate and rattle relative to the wheel rim assembly.

Detailed description of a preferred embodiment

In FIGURE 1 of the drawings, a wheel assembly is referred to generally by reference numeral 12. The wheel assembly 12 includes a spider portion 14 joined to a rim portion 16 by a series of rivets 18. A pneumatic tire 20 is mounted about the rim portion 16.

The rim 16 is of the drop center type having a contoured circumferential surface including a portion 22 inclined approximately 45 degrees to the axis of rotation of the wheel assembly 12. A series of evenly spaced holes 24 are formed in portion 22. A pressure sensor 26 is received in each of the holes 24. The pressure sensor 26 is received in each of the holes 24. The pressure sensor is a spool-shaped rubber plug having a diaphragm portion 28 which protrudes from the radially inner surface of the rim portion 16 in proportion to the air pressure within the tire enclosure. A metal flanged cylindrical retainer or ferrule 30 fits tightly within the open end of the pressure sensor 26 and prevents a surge of air pressure within the tire enclosure from pushing the sensor out of the hole 24.

An annular sounding member 32 is loosely retained within the spider 14 and the rim 16 by a flanged ring 34 which may be welded to the spider portion of the wheel assembly 12. Ring 34 has an L-shaped cross section which receives a radially inwardly extending lip portion 35 of member 32 as shown by FIGURES 1, 3 and 4 of the drawings. A series of slots 36 are formed in the member 32 to provide clearance for the rivets 18 and to prevent the member from turning relative to the wheel assembly 12. The member 32 is spaced apart from, but follows generally, the adjacent inside circumferential contours of the spider 14 and rim 16. A belled portion 38 of the member 32 is approximately parallel to the portion 22 of the rim 16 and contacts the pressure sensors 26.

Operation

When the pneumatic tire is properly inflated, all of the pressure sensors 26 are sufficiently expanded to center the sounding member 32 within the wheel assembly 12 and to hold the member in a fixed position relative to the wheel. If the air pressure within the tire drops below a predetermined level, the pressure sensors 26 deflate and retract sufficiently to release their grip upon the sounding member 32. The member is then free to rattle and vibrate as the wheel rotates, thus providing the vehicle operator with audible and tactile signals warning of an underinflated tire.

The foregoing description presents the presently preferred embodiment of the invention. Modifications and alterations will occur to those skilled in the art that are included within the scope and spirit of the following claims.

I claim:
1. A device to signal underinflation of an automotive vehicle tubeless pneumatic tire comprising:
  a wheel assembly including a rim portion having a radially outer surface and a radially inner surface, said radially outer surface forming an enclosed chamber with said pneumatic tire,
  a sounding member positioned at least in part radially within said rim portion,
  means to loosely retain said sounding member to said wheel assembly,
  pressure sensing means mounted in the rim portion adjacent said sounding member, said pressure pressure sensing means being in communication with said tire chamber and expandable in proportion to the air pressure within said tire chamber, said pressure sensing means being spaced apart from said sounding member when the tire is in a condition of underinflation permitting the sounding member to vibrate relative to said wheel assembly as the wheel rotates, said pressure sensing means being in contact with said sounding member during normal inflation of the vehicle tire, centering the sounding member and preventing its vibration within the wheel assembly.
2. A device to signal underinflation of an automotive vehicle tubeless pneumatic tire comprising:
  a wheel assembly including a rim portion having a radially outer surface and a radially inner surface, said radially outer surface forming an enclosed chamber with said pneumatic tire, said rim portion being formed with a plurality of spaced holes, plug members received in said holes providing airtight seals, said plug members having resilient diaphragm portions expandable to protrude from said radially inner surface, a sounding member received within the radially inner surface of said rim portion, means to loosely retain said sounding members to said wheel assembly, said diaphragms being spaced apart from said sounding member when the tire is in a condition of underinflation permitting the sounding member to vibrate relative to said wheel assembly during wheel rotation, said diaphragms being in contact with said sounding member during normal inflation of the vehicle tire thereby centering the sounding member and preventing its vibration within said rim portion.

3. A device to signal underinflation of an automotive vehicle pneumatic tire according to claim 2 and including: said sounding member being of an annular shape.

4. A device to signal underinflation of a vehicle pneumatic tire according to claim 2 and including:

said sounding member being of a generally annular shape, a portion of said sounding member having a radially outer surface generally parallel to the radially inner surface of the adjacent portion of said rim portion, said diaphragms when under normal tire pressure preventing contact between said parallel portions.

5. A device according to claim 2 and including:

a series of rivets protruding radially inwardly from said rim portion, a series of slots formed in said sounding member receiving a portion of one of said rivets thereby positioning said sounding member and preventing said member from rotating relative to said wheel assembly.

6. A device according to claim 2 and including:

said sounding member being of an annular shape and having a radially inwardly extending lip portion, said means comprising a retaining ring having a radially outwardly extending flange portion, the outer diameter of said flange portion being greater than the inside diameter of said lip portion, said ring being secured to said wheel assembly, said lip portion being loosely received between said flange portion and wheel assembly.

7. A device to signal underinflation of an automotive vehicle pneumatic tire according to claim 2 and including:

said rim portion formed with said plurality of holes being equally spaced.

8. A device to signal underinflation of an automotive vehicle pneumatic tire according to claim 7 wherein said means comprises:

a flanged ring secured to said wheel assembly loosely retaining said sounding member within the radially inner surface of said rim portion.

9. A device to signal underinflation of an automotive vehicle pneumatic tire according to claim 8 and including: said sounding member being of an annular shape.

References Cited

UNITED STATES PATENTS

| | | | |
|---|---|---|---|
| 1,451,291 | 4/1923 | Darling | 116—34 |
| 2,374,748 | 5/1945 | Heath | 116—34 |

LOUIS J. CAPOZI, Primary Examiner

U.S. Cl. X.R.

116—67